United States Patent
Zapp et al.

(10) Patent No.: US 6,598,424 B2
(45) Date of Patent: Jul. 29, 2003

(54) PROCESS AND APPARATUS FOR SEPARATING A GAS MIXTURE WITH EMERGENCY OPERATION

(75) Inventors: Gerhard Zapp, Pullach (DE); Christian Kunz, Munich (DE)

(73) Assignee: Linde Aktiengesellschaft, Wiesbaden (DE)

( * ) Notice: Subject to any disclaimer, the term of this patent is extended or adjusted under 35 U.S.C. 154(b) by 0 days.

(21) Appl. No.: 10/094,137

(22) Filed: Mar. 11, 2002

(65) Prior Publication Data

US 2002/0170313 A1 Nov. 21, 2002

(30) Foreign Application Priority Data

Mar. 9, 2001 (DE) .......................................... 101 11 428

(51) Int. Cl.[7] ................................................. F25J 3/00
(52) U.S. Cl. ............................ 62/646; 62/656; 62/913; 62/915
(58) Field of Search ......................... 62/913, 915, 656, 62/646

(56) References Cited

U.S. PATENT DOCUMENTS

| | | |
|---|---|---|
| 3,191,393 A | 6/1965 | Dennis |
| 3,721,097 A | 3/1973 | Briley et al. |
| 3,901,673 A | 8/1975 | Zahn et al. |
| 5,596,885 A * | 1/1997 | Grenier ........................ 62/913 |
| 5,778,700 A * | 7/1998 | Lee et al. ...................... 62/656 |
| 5,979,183 A * | 11/1999 | Smith et al. ................... 62/915 |
| 6,155,079 A | 12/2000 | Vigor et al. |
| 6,185,960 B1 * | 2/2001 | Voit .............................. 62/656 |

FOREIGN PATENT DOCUMENTS

| | | |
|---|---|---|
| EP | 0 949 471 | 10/1999 |
| EP | 1 031 804 | 8/2000 |

* cited by examiner

Primary Examiner—Ronald Capossela
(74) Attorney, Agent, or Firm—Millen, White, Zelano & Branigan, P.C.

(57) ABSTRACT

The process and the apparatus serve for separating a gas mixture in a separation plant. A feed gas (18) is introduced into a compressor system (6, 16) and then into the separation plant. In the event of loss or partial loss of the compressor system (6, 16) of the first feed gas compressor (6), a first auxiliary stream (91, 92) which has approximately the composition of the first product stream or approximately the composition of the feed gas is compressed (78, 89) to at least approximately the first pressure and is recirculated to the separation plant.

16 Claims, 1 Drawing Sheet

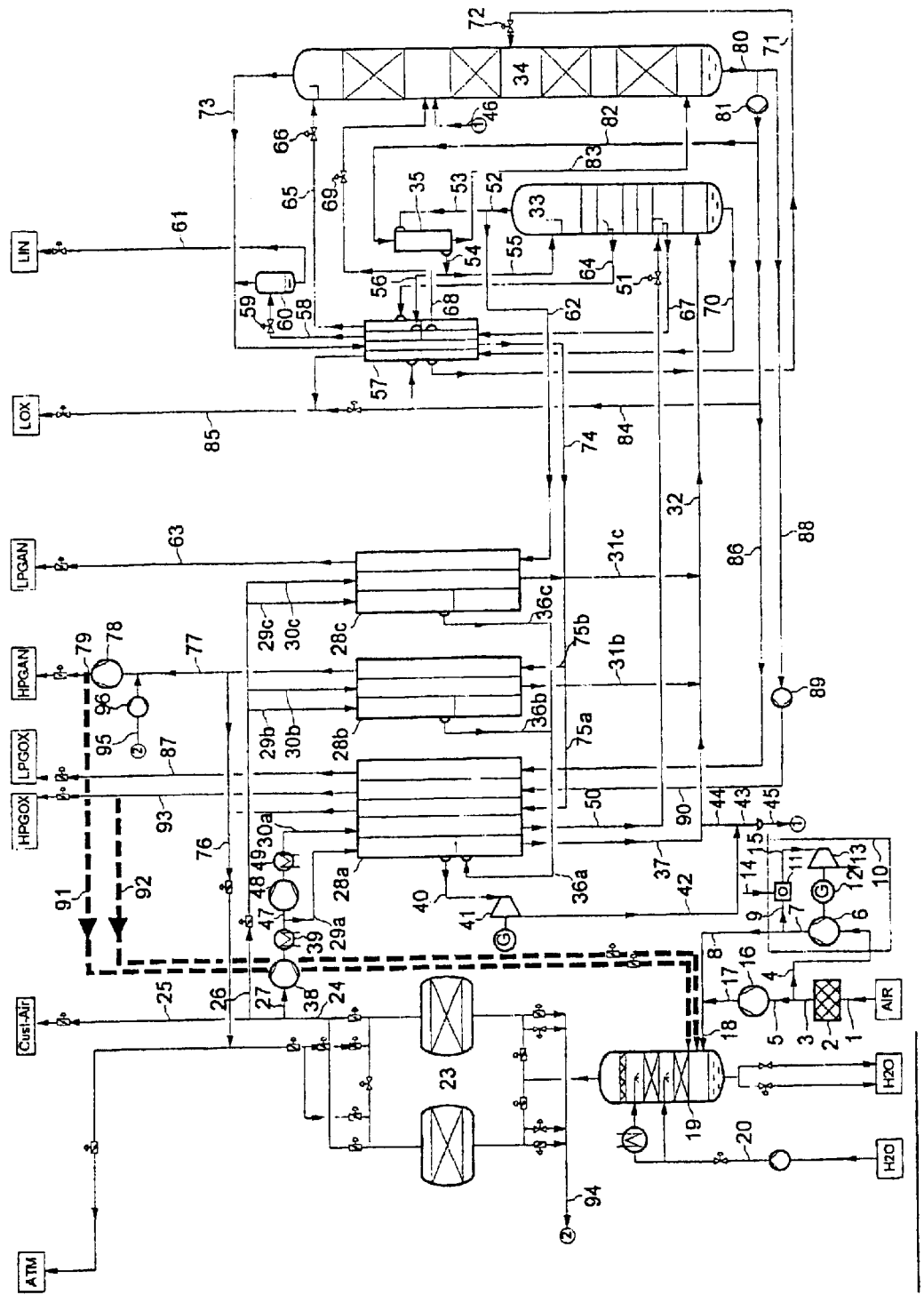

PROCESS AND APPARATUS FOR SEPARATING A GAS MIXTURE WITH EMERGENCY OPERATION

The invention relates in general to a process and apparatus for separating a gas mixture for example, cryogenically in a separating plant, in which process feed gas is compressed to a first pressure and then introduced into a separation system in order to separate a first product stream.

Whereas the separating plant usually operates in the steady state, the invention is directed to conditions wherein the plant is beset with at least a partial loss of compressor function.

In such separating plants, various compressor systems can be used to compress the feed gas:
- a single compressor, for example having a plurality of sequential stages
- two or more serially-connected separate compressors
- two or more compressors connected in parallel
- comprehensive gas compression system which supplies not only the separation plant, but other large consumers (for example pressurized gas system, in particular compressed air network with compressor rail)

The preferred field of application of the invention is a cryogenic air separation process for supplying an integrated power station process (IGCC—Integrated Gasifier Combined Cycle Process). Energy production is served by a gas turbine system which has a gas turbine (gas turbine expander), a gas turbine compressor driven by the gas turbine and a combustion chamber. One or more products of the air separation are used in the energy production system. For example, oxygen produced in the air separator can be used to produce a fuel gas with which the combustion chamber is charged; in this case the oxygen serves in particular as oxidizing agent in coal or heavy oil gasification. Alternatively, or additionally, nitrogen introduced from the air separator into the gas turbine stream can be used by feeding it into the combustion chamber or the gas turbine or mixing it with the gas turbine exhaust gas between combustion chamber and gas turbine of the combustion chamber. In some cases, nitrogen can also be used to transport coal into a synthesis gas plant.

The gas turbine compressor supplies firstly the air required for the combustion process and secondly a portion of the feed air for the air separator (the "first feed gas stream"); it thus represents the "first feed gas compressor" in the context of the invention. In the process of the invention another portion of the feed air for the air separation (the "second feed gas stream") is compressed by a separate air compressor (the "second feed gas compressor"), which is driven independently of the gas turbine system, for example by means of an electric motor or a steam turbine. The ratio between the first and second feed air stream can in principle have any value. In practice, it is generally 30:70 to 70:30, preferably 40:60 to 60:40.

If the gas turbine fails owing to an operating fault, after a very short time the appropriate feed air rate for the air separator is lacking. Together with the fall in air rate and air pressure, the load of the rectification column(s) of the air separator also falls, the liquid (holdup) drops from the plates or the packings to the bottom and all product purity grades are lost. Hitherto, no process has been known for maintaining the separation process in the air separator after such a fault. Further operation of consumers of the air separator, for example the gasification plant, is only possible temporarily using an external emergency supply involving expensive pressurized tanks and evaporating liquid products.

It is an object of one aspect of the invention, therefore, to provide a process and apparatus for gas separation of preferably the type mentioned at the outset which can operate further in the event of loss of one of the two feed gas compressors. Upon further study of the specification and appended claims, further objects and advantages of this invention will become apparent to those skilled in the art.

According to one aspect of the invention, in the event of loss or partial loss of the compressor system, a first auxiliary stream which has approximately the composition of a first product stream or approximately the composition of the feed gas is compressed to approximately the first pressure and is recirculated to the separation plant.

In the context of the present invention, the feed gas rate which is lacking owing to a fault in the compressor system is at least partially replaced by an auxiliary stream from a different source. In this manner, the decrease in the rate of feed gas is at least partially compensated and the separation process (for example a rectification) can be maintained. It is then possible to bring the separation plant in a controlled manner into a partial load mode and thus to decrease the auxiliary stream rate, if appropriate to zero.

The designation "approximately" with respect to the composition of the first auxiliary gas denotes a deviation of the proportion of each component of a maximum of 5 mol %, preferably a maximum of 1 mol %. In the specification of pressure, "approximately" permits deviations of the order of magnitude of the pipeline losses and of the flow losses.

The other source from which the auxiliary stream comes can be, for example, the separation plant itself. In this case, in the event of a fault, at least one first product stream of the separation plant is recirculated to the separation plant. Especially when the product or products are produced in any case under pressure, the product stream to be recycled can be taken off downstream of the existing product compressor or from an intermediate stage of the product compressor, if appropriate expanded to the feed gas pressure (the "first pressure") and fed back to the separation plant, for example to the rectification column or to a rectification column of an air separator.

Thus, although the product rate is also decreased (in the event of total loss of the compressor system the separation plant can under some circumstances initially no longer deliver any product at all), this disadvantage is, however, more than compensated for by the virtually uninterrupted further operation of the separation plant. If there is such a need, the consumers can be supplied by an emergency supply system (backup system) in the period of decreased or absent product delivery. Such a system has, for example, a storage unit in the form of at least one liquid tank and/or a gas pressurized store. The storage unit can be filled from outside the separation plant (for example using tanker vehicles or pipelines) and/or by product produced in usual operating mode of the separation plant. If the storage unit is in any case at a pressure which is at least approximately equal to the "first pressure" (the outlet pressure of the compressor system), there is no requirement for a separate pressure boosting system for recycling the corresponding auxiliary stream to the separation plant.

If such an emergency supply system is present, an emergency supply stream produced there can also be recirculated to the separation plant, instead of to the consumer, alternatively or additionally to one or more product streams from the separation plant.

Preferably, in the event of loss or partial loss of the compressor system, two product streams of different composition are recirculated to the separation plant, for example a nitrogen stream and an oxygen stream in the case of air separation. As a result, it is possible within the scope of modern process control technology to adapt the composition in the recycle stream substantially to the feed gas. In the optimum case, not only the total rate of the recycled product streams, but also their relative rates, are set so that they correspond as far as possible exactly to the missing feed gas rate. Thus the loss of the first feed gas compressor has no direct effect on the separation process—the separation plant experiences virtually nothing from this serious operating fault in the compression of the feed gas. Obviously, the two recycled streams ("auxiliary streams") can also be formed in part or completely by emergency supply streams.

When a first and a second feed gas compressor are connected in parallel in the compressor system, the inventive emergency connection is used, especially when one of the two feed gas compressors is lost in whole or in part. In this case the two feed gas compressors can take in two part-streams of the feed gas, either via a shared line, in which case this shared line has, for example, one filter; or the inlet of each of the two feed gas compressors can be connected to a separate intake line which is independent of the intake line of the other feed gas compressor.

In principle it is possible to introduce the recycled auxiliary stream or streams separately into the separating device, for example into a rectification column. However, it is more expedient if the recirculated product stream, or the recirculated product streams, are mixed with the compressed second part-stream of the feed gas and the mixture is introduced jointly into the separating plant, for example into the coldbox of an air separator. The mixing can be performed upstream or downstream of a purifying device for the feed gas. For example, the recycled product stream or streams can be introduced directly into a cooling device for the feed gas, for example a direct contact cooler.

To compress the recirculated product streams, preferably those devices are used which, in fault-free operation, serve to produce the required product pressure. These can be, for example, a multistage gas compressor (external compression) and/or a device for internal compression that comprises a liquid pump and means for vaporizing the product stream brought to pressure in the liquid state. In the case of external compression, the product stream to be recycled is taken off downstream of the gas compressor or from the outlet of one of its intermediate stages. In the case of a pure internal compression, takeoff is performed downstream of the heat exchanger for product vaporization, for example at the warm end of a main heat exchanger obviously, internal and external compression can also be combined in the same product stream. In the case of air separation, nitrogen is frequently externally compressed and oxygen is subjected to internal compression.

An important field of application of the invention is, as already stated, air separation plants, in particular cryogenic air separation plants. In these the feed gas is formed by air, the separation plant by an air separation plant and the recirculated product stream or the recirculated product streams by a nitrogen product stream and/or by an oxygen product stream and/or by corresponding streams from an emergency supply system. In the case of a cryogenic air separator, the "separation plant" comprises the entire coldbox including the rectification column(s) for nitrogen/oxygen separation and the main heat exchanger. It is preferably a classic Linde double-column plant. However, the invention can be used in other two-column processes, in single-column processes or in processes having three or more columns. Particularly advantageously, the invention can be used in air separation processes in connection with IGCC plants, as described, for example, in DE 2434238, DE 2503193, Springmann, Linde-Berichte aus Technik und Wissenschaft, 51/1982 pp. 55–65, Rottman, Schonpflug, Sauerstoffversorgung für Kohlevergasungs-Kraftwereke (Combined Cycle Process) [Oxygen supply for coal gasification power stations (Combined Cycle Process)], BMFT-Forschungsvericht T 82–018, Beysel, Sommerfeld, VGB Conference "Kohlevergasung 1991" [Coal gasification 1991], 16–17.05.1991, Dortmund, Lecture D1, EP 758733 B1, DE 19818308 A1, German Patent Application 10052180 which does not have an earlier priority than the present application, and the applications corresponding thereto, and German Patent Applications 10103968 and 10103957 which do not have earlier priority than the present application, and the applications corresponding thereto.

In principle, the inventive product recycling can be used in any gas separation process having at least two feed gas compressors operating in parallel, in particular in any air separation process having at least two parallel air compressors. Furthermore, the product recycling can also be used in separation processes having a single compressor. If this fails completely, however, the entire production must first be recirculated, that is to say no end products are available for the consumer or consumers. However, under some circumstances, this can nevertheless be expedient in order to be able to shut down the separation plant in a controlled manner or to keep it in operation (so to speak in idling mode).

The invention also relates to an apparatus for gas separation, in particular for the cryogenic separation of air according to Patent Claim 13.

The invention and other details of the invention are described in more detail below with reference to an illustrative embodiment shown in the drawing. The example relates to a cryogenic air separation plant which serves for supplying an IGCC process.

Feed air flows in via a shared air line 1, 3 through a filter 2 and is then divided into a first part 4 and a second part 5. The first part 4 is brought in a first air compressor 6 to a first pressure of, for example, 10 bar. The air compressor is part of a gas turbine system 10 which has in addition a combustion chamber 11, a generator 12 and a gas turbine expander 13 which drives the generator 12 and the first air compressor (gas turbine compressor) 6 via a mechanical coupling.

Of the compressed first part 7 of the air, only a part 8 is used as feed air for the air separator and forms the "first part-stream of the feed gas". The remainder 9 flows into the combustion chamber 11 and acts as oxidizing agent in the combustion of a fuel gas 14. The exhaust gases 15 from the combustion are work-expanded in the gas turbine expander 13.

The second part 5 of the air forms the "second part-stream of the feed gas" and is brought to the same first pressure in a second air compressor 16. The two compressed part-streams 8, 17 of the feed air are fed jointly via a line 18 to a direct contact cooler 19. In the example, the first and second part-streams each form about 50% of the total amount of air which flows through the line 18. The amount of combustion air is not taken into account in this calculation.

In the direct contact cooler 19 the feed air enters into direct heat exchange with water 20. Heated water 21 is taken off from the bottom of the direct contact cooler; cooled air 22 exits at the top. The latter is fed to a purification device 23 which, in the example, consists of a pair of molecular sieve adsorbers, which can be switched over. A small part 25 of the purified air 24 is taken off as instrument air or compressed air to a user (Cust-Air). The remainder is apportioned to lines 26 and 27 and flows into the coldbox (not shown) of the separation plant, more precisely to the warm end of a main heat exchanger system which, in the example, consists of three blocks 28a, 28b, 28c. The air stream 26 is fed at approximately the first pressure (minus piping losses) to the warm end of blocks 28b and 28c (lines 29b, 29c, 30b, 30c). A part 31b, 31c flows through the main heat exchanger to the cold end and is finally introduced via line 32 in the gaseous state into the high-pressure column 33 of a rectification system which has, in addition, a low-pressure column 34 and a condenser-evaporator (main condenser) 35. Another part 36b, 36c is taken off (36b, 36c) from the main heat exchanger blocks 28b and 28c above the cold end at an intermediate temperature and fed as balancing stream 36a to the other block 28a at a corresponding intermediate point in order to be cooled up to the cold end there and finally also to be fed via the lines 37 and 32 to the high-pressure column 33.

The air stream 27 is brought in a first recompressor 38 with aftercooler 39 to a second pressure which is higher than the first pressure and is, for example, 87 bar. A part 29a of the air compressed to the second pressure is cooled in block 28a of the main heat exchanger system to an intermediate temperature and is work-expanded to approximately the first pressure via line 40 of an expansion turbine 41. The two-phase mixture exiting from turbine 41 is subjected to a phase separation 43. The gaseous fraction flows via the lines 44 and 32 into the high-pressure column 33, and the liquid 45, 46 is introduced directly into the low-pressure column 34.

Another part 47 of the air compressed to the second pressure is brought to a still higher third pressure, for example 87 bar, in a second recompressor 48 with aftercooler 49 and is also introduced (30a) into block 28a. It serves to vaporize oxygen product brought to pressure in the liquid state and exits from the cold end of the main heat exchanger in supercritical or liquid state and is expanded (51) into the high-pressure column 33.

At the top of the high-pressure column 33, gaseous pure nitrogen 52 is taken off and, at least to a first part 53, liquefied in the main condenser 35. Resultant condensate 54 is applied as reflux 55 to the high-pressure column 33 or produced as liquid product (LIN) via line 56, subcooling counterflow heat exchanger 57, line 58, throttle valve 59, separator (phase separation device) 60 and line 61. A part of the gaseous nitrogen 52 from the top of the high-pressure column 33 can be taken off directly as medium-pressure product (LPGAN) via line 62, main heat exchanger block 28c and line 63.

The recycled liquid 64 for the low-pressure column 34 is, in the exemplary embodiment, taken off from an intermediate point of the high-pressure column 33 and, after subcooling 57 via line 65 and throttle valve 66, is applied to the top of this column. In addition, at least a part of the liquefied air which was intermediately expanded in 51 is taken off again from the high-pressure column 33 via line 67, subcooled (57) and fed via line 68 and throttle valve 69 to the same intermediate point of the low-pressure column 34 at which the liquid air 46 from the turbine 41 is also introduced. Liquid crude oxygen 70 from the bottom of the high-pressure column 33 is, after subcooling 57, fed via line 71 and throttle valve 72 somewhat lower down into the low-pressure column.

The impure overhead nitrogen 73 from the low-pressure column 34 is warmed in the subcooling countercurrent heat exchanger 57 and fed via lines 75a and 75b to block 28a and block 29b, respectively, of the main heat exchanger system. After warming to approximately ambient temperature, a part 76 of the low-pressure column nitrogen is used as regeneration gas 77 for the purification device 23 or blown off (78) into the atmosphere. Another part is, if appropriate supplemented by moist regeneration gas 94, 95 which is passed to a recompressor 96, brought in a product compressor 78 to the required product pressure, for example 24 bar, and taken off as high-pressure product (HPGAN) via line 79.

The liquid oxygen product 80 of the low-pressure column 34 serves four different purposes. A first part 82 is transported by a pump 81 to the main condenser 35 and is partially vaporized there against the condensing overhead nitrogen 53 of the high-pressure column 33. The two-phase mixture 83 formed in the evaporation space of the main condenser 35 is recirculated to the low-pressure column 34. The gaseous fraction serves as ascending vapour in the low-pressure column 34.

A second part and a third part 84, 86 are also transported by the pump 81 and then, if appropriate after subcooling in 57, are removed via line 85 as liquid product (LOX), or passed to the main heat exchanger block 28a, vaporized and warmed there and finally discharged via line 87 as gaseous low-pressure product (LPGOX).

A fourth part is brought by internal compression to a very high product pressure of, for example, 81 bar, by producing an appropriately high pressure in a further pump 89, and the supercritical oxygen 90 is introduced into block 28a of the main heat exchanger system and warmed there at the high pressure. The internally compressed oxygen, after warming, is taken off via line 93 as high-pressure product.

In the usual operating mode of the plant, all pressurized products are passed on in their entirety to the corresponding consumers, the high-pressure oxygen 93, for example, to one or more gasification units in which the fuel gas 14 is produced, and the high-pressure nitrogen into the combustion chamber 14 or to exhaust gas 15 (not shown). If the gas turbine fails, after an extremely short time about 50% of the feed air 18 for the air separator is lost. According to the invention, in this moment, appropriate proportions of the pressurized products 79, 80 are introduced via the lines 91 and 92 shown in dashed form into the direct contact cooler 19 and immediately replace the missing amount of air. Since the pressures in the product lines 79, 93 are higher than the air pressure (operating pressure of the direct contact cooler), no machines need to be used for this. The lines 91 and 92 need only to be fitted with suitable expansion valves which prevent pressure hammer on the direct contact cooler 19 and the downstream purification device 23. The rate control for the recycled product streams 91, 92 can also be limited by pressure governors. In terms of control technology, this emergency connection may be implemented in the context of run-off control; it is initiated by a fall in the speed of rotation of the gas turbine expander.

TABLE 1

| Usual operating mode (design) | | |
| --- | --- | --- |
| Air rate | HP-GOX | HP-GAN |
| 380,000 m³(STP)/h, 10 bar | >> 81000 m³(STEP)/h, 81 bar | 285000 m³(STP)/h, 24 bar |

TABLE 2

Loss of the gas turbine compressor (GT-trip)

| Air rate | | HP-GOX | HP-GAN |
|---|---|---|---|
| 190,000 m$^3$(STP)/h | >> | 81000 m$^3$(STP)/h | 285000 m$^3$(STP)/h |
| 190,000 m$^3$(STP)/h | << | 41900 m$^3$(STP)/h | 150900 m$^3$(STP)/h |
| <<recycle | | | |
| 380,000 m$^3$(STP)/h | >> | 39100 m$^3$(STP)/h | 134100 m$^3$(STP) |

Alternatively, the recycled product streams can also be fed into the feed airline between cooling device 19 and purification device 23. If the streams are dry, mixing with the feed air downstream of the purification device 23 also comes into consideration, for instance by introduction into line 24.

The recycled product amount is obviously no longer available for the consumers. With respect to the nitrogen, this is without further consequences, since the gas turbine into which it is passed in usual operating mode is in any case out of action. The oxygen consumer, customarily a gasification unit, however, must be reduced to about half load. For example, in the case of a two-train gasification unit, at least one of the two trains can still be operated. This facilitates considerably the restart of the gas turbine, compared with total loss.

By means of the invention, for the IGCC process which, in the exemplary embodiment, is the consumer of the air separation plant products, there results a significantly lower failure probability. As a result the operating costs decrease with a relatively low additional increase in capital expenditure. This could contribute to the relatively environmentally friendly, but fault-susceptible, IGCC technology gaining greater acceptance.

The preceding examples can be repeated with similar success by substituting the generically or specifically described reactants and/or operating conditions of this invention for those used in the preceding examples. Also, the preceding specific embodiments are to be construed as merely illustrative, and not limitative of the remainder of the disclosure in any way whatsoever.

The entire disclosure of all applications, patents and publications, cited above and below, and of corresponding German application 10111428.1, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for separating a gas mixture in a separating plant comprising compressing feed gas (18) to a first pressure in a compressor system (6, 16) and introducing the compressed feed gas at least in part into the separation plant to produce at least a first product stream (91, 92) and wherein the process experiences at least a partial loss of function of the compressor system (6, 16), the improvement comprising bringing at least a first auxiliary stream having approximately the composition of the first product stream or approximately the composition of the feed gas (78, 89) to at least approximately the first pressure, and recirculating the resultant first auxiliary stream to the separation plant.

2. A process according to claim 1, wherein the auxiliary stream comprises the first product stream (91, 92).

3. A process according to claim 1, further comprising providing an emergency supply stream in a storage unit, and wherein the auxiliary stream comprises at least said first emergency supply stream withdrawn from said storage unit.

4. A process according to claim 1, further comprising providing a second auxiliary stream comprising a second product stream (92) from the separation plant and/or a second emergency supply stream from a storage unit and which has a different composition from the first auxiliary stream (91), and compressing (89), said second product stream and/or the second emergency supply stream at least to approximately the first pressure and recirculating the resultant stream (5) to the separation plant.

5. Process according to claim 4, characterized in that the relative rates of the recirculated auxiliary streams (91, 92) are set in such a manner that their mixture corresponds approximately to the composition of the feed gas (18).

6. A process according to claim 1, further comprising passing the recirculated auxiliary stream to the separation plant at an absolute rate approximately equal to a decreased rate of feed gas owing to at least a partial loss of the compressor system (6, 16) and concomitantly with a loss to at least a resultant first partial stream (8) from at least one of the compressors (6, 16).

7. A process according to claim 1, wherein in the compressor system, a first part-stream of the feed gas is compressed in a first feed gas compressor (6) and a second part-stream of the feed gas is compressed in a second feed gas compressor (16) and both the compressed first part-stream (8) and the compressed second part-stream (17) are introduced at least in part into the separation plant, and in the event of loss of the first feed gas compressor (6) the auxiliary stream(s) is (are) compressed (78, 89) at least to approximately the first pressure and is (are) recirculated to the separation plant.

8. A process according to claim 7, further comprising mixing the recirculated auxiliary stream(s), (91, 92) with the compressed second part-stream of the feed gas.

9. A process according to claim 8, further comprising purifying the feed gas in a purification device (23) and conducting the mixing of at least a part of the recirculated auxiliary stream(s), with the compressed second part-stream of the feed gas upstream or downstream of said purification device (23) for the feed gas.

10. A process according to claim 8, further comprising cooling the feed air in cooling device (18) and conducting the mixing of at least a part of the recirculated auxiliary stream(s), with the compressed second part-stream of the feed gas upstream, in, or downstream of said cooling device (18).

11. A process according to claim 1, comprising conducting the compression of the recirculated auxiliary stream(s), by internal compression and/or external compression.

12. A process according to claim 1, wherein the feed gas comprises air (1, 18), the separation plant is a cryogenic air separation plant including a coldbox, and the recirculated auxiliary stream(s), comprise a nitrogen stream (73, 74, 77, 91) and/or an oxygen stream (80, 88, 89, 90, 93, 92) which are discharged from the air separation plant as product streams and/or are taken off from one or more storage units.

13. An apparatus for separating a gas mixture having a compressor system and a separation plant, said apparatus having a feed gas line connecting an outlet of the compressor system to an inlet of the separation plant, an auxiliary line (91, 92) for introducing an auxiliary stream which has approximately the composition of a first product stream of the separation plant or approximately the composition of the feed gas, and a control device for shutting off the auxiliary line in the steady state operating mode of the apparatus and for opening the auxiliary line (91, 92) in response to a loss or partial loss of the compressor system (6, 16).

14. Apparatus according to claim 13, further comprising a gas turbine compressor, a combustion chamber, fuel gas forming means and a line containing oxygen from the separation plant in communication with said fuel gas forming means and a line containing fuel gas from said fuel gas forming means in communication with said combustion chamber.

15. Apparatus according to claim 13, further comprising a gas turbine compressor, a combustion chamber, and line containing nitrogen from said separation plant in communication with said combustion chamber or with exhaust gas from said gas turbine.

16. A process for separating a gas mixture in a separating plant in which feed gas (18) is compressed to a first pressure in a compressor system (6, 16) and is then introduced at least in part into the separation plant in which, in usual operating mode, at least a first product stream (91, 92) is produced, characterized in that in the event of loss or partial loss of the compressor system (6, 16) a first auxiliary stream which has approximately the composition of the first product stream or approximately the composition of the feed gas is brought (78, 89) to at least approximately the first pressure and is recirculated to the separation plant.

\* \* \* \* \*